US006255256B1

(12) United States Patent
Van Slyke

(10) Patent No.: US 6,255,256 B1
(45) Date of Patent: *Jul. 3, 2001

(54) NON-TOXIC, INEXPENSIVE SYNTHETIC DRILLING FLUID

(75) Inventor: Donald C. Van Slyke, Missouri City, TX (US)

(73) Assignee: Union Oil Company of California, El Segundo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/207,185

(22) Filed: Dec. 8, 1998

Related U.S. Application Data

(60) Division of application No. 08/580,112, filed on Jan. 29, 1996, now Pat. No. 5,958,845, which is a continuation-in-part of application No. 08/494,441, filed on Jul. 24, 1995, now abandoned, which is a continuation-in-part of application No. 08/422,476, filed on Apr. 17, 1995, now Pat. No. 5,635,457.

(51) Int. Cl.$^7$ ................................................ C09K 7/06
(52) U.S. Cl. .......................................... 507/103; 507/905
(58) Field of Search ................................ 507/103, 905; 166/305.1

(56) References Cited

U.S. PATENT DOCUMENTS

| | | | |
|---|---|---|---|
| 2,816,073 | 12/1957 | Stratton | 252/8.5 |
| 3,684,012 | * 8/1972 | Scheffel | 507/103 |
| 3,878,117 | 4/1975 | Williams et al. | 252/47 |
| 3,912,683 | 10/1975 | O'Farrell | 260/29.7 |
| 3,954,627 | 5/1976 | Dreher et al. | 252/8.5 P |
| 4,007,149 | 2/1977 | Burton et al. | 260/29.7 B |
| 4,012,329 | 3/1977 | Hayes et al. | 252/8.5 P |
| 4,148,821 | 4/1979 | Nussbaum et al. | 260/505 |
| 4,153,588 | 5/1979 | Makowski et al. | 260/23.5 |
| 4,390,474 | 6/1983 | Nussbaum et al. | 260/505 |
| 4,425,462 | 1/1984 | Turner et al. | 524/400 |
| 4,447,338 | 5/1984 | Lundberg et al. | 252/8.5 M |
| 4,488,975 | 12/1984 | Almond | 252/8.55 R |
| 4,552,215 | 11/1985 | Almond | 166/278 |
| 4,553,601 | 11/1985 | Almond et al. | 166/308 |
| 4,671,883 | 6/1987 | Connell et al. | 252/8.515 |
| 4,787,990 | 11/1988 | Boyd | 252/8.511 |
| 4,810,355 | 3/1989 | Hopkins | 208/58 |
| 4,900,456 | 2/1990 | Ogilvy | 252/8.551 |
| 5,045,219 | 9/1991 | Trahan et al. | 252/8.51 |
| 5,096,883 | 3/1992 | Mercer et al. | 507/103 |
| 5,189,012 | 2/1993 | Patel et al. | 507/103 |
| 5,333,698 | 8/1994 | Van Slyke | 175/65 |
| 5,432,152 | 7/1995 | Dawson et al. | 507/103 |
| 5,498,596 | 3/1996 | Asijian et al. | 507/103 |
| 5,569,642 | 10/1996 | Lin | 507/103 |
| 5,589,442 | 12/1996 | Gee et al. | 507/103 |
| 5,635,457 | 6/1997 | Van Slyke | 507/103 |

FOREIGN PATENT DOCUMENTS

| | | |
|---|---|---|
| 3074 5/89 | 9/1989 | (AU) . |
| B 7504 3/94 | 3/1995 | (AU) . |
| 0124194 | 11/1984 | (EP) . |
| 0247801 | 12/1987 | (EP) . |
| 0254412 | 1/1988 | (EP) . |
| 2166782 | 5/1986 | (GB) . |
| 2212192 | 7/1989 | (GB) . |
| 8302949 | 9/1983 | (WO) . |
| WO/9416030 | 7/1994 | (WO) . |
| WO 9509215 | 4/1995 | (WO) . |
| WO/9521225 | 8/1995 | (WO) . |

OTHER PUBLICATIONS

C&EN, Jun. 12, 1989, "Science/Technology Concentrates," p. 21.
European Chemical News, Jul. 29, 1991, "ECN Technology," p. 20.
*Oil & Gas Journal*, Feb. 17, 1986, Technology, "Process Makes Mid–Distillates from Natural Gas," pp. 74–76.
Bartholomew, C. H., Catalysis Letters 7 (1990), "Recent Technological Developments in Fischer–Tropsch Catalysis," J. C. Baltzer A.G., Scientific Pub. Co., pp. 303–315.
IADC/SPE 11355, (1993).
Dry, M. E., *Hydrocarbon Processing*, Aug. 1982, "Sasol's Fischer–Tropsch Experience," pp. 121–124.
Biske et al., *Proceedings Fourth World Petroleum Congress*, Section III/A, pp. 1–17, (1955).
Boyd et al., "New Base Oil Used in Low–Toxicity Oil Muds," *Society of Petroleum Engineers of AIME*, Jan. 1985, pp. 137–141.
Dry, M. E., "The Sasol Fischer–Tropsch Processes," *Applied Industrial Catalysis*, vol. 2, Chapter 5, Academic Press, Inc., (1983), pp. 167–213.
Dry, M. E., "Commercical Conversion of Carbon Monoxide to Fuels and Chemicals," *Journal of Organometallic Chemistry*, 372 (1989), pp. 117–127.
Eilers et al., "The Shell Middle Distillate Synthesis Process (SMDS)," *Catalysis Letters* 7 (1990), pp. 253–269, J.C. Baltzer A. G., Scientific Pub. Co.
Fiero, G. W., "Purity of White Mineral Oil," vol. 23, pp. 226–231 (May, 1965).

(List continued on next page.)

*Primary Examiner*—Philip Tucker
(74) *Attorney, Agent, or Firm*—Shlomo R. Frieman; Gregory F. Wirzbicki

(57) ABSTRACT

A non-toxic, inexpensive synthetic fluid for use in wellbore fluids (e.g., drilling fluids) is selected from the group consisting of (A) fluids having (I) a pour point greater than about –30° C. (–22° F.) and (II) a cetane index greater than 50, and comprising (i) at least about 95 weight percent hydrocarbons containing 11 or more carbon atoms, (ii) greater than 5 weight percent hydrocarbons containing 18 or more carbon atoms, (iii) at least about 50 weight percent isoparaffins, (iv) at least about 90 weight percent total paraffins, (v) about 1 or less weight percent naphthenics, (vi) less than 0.1 volume percent aromatics, and (vii) at least 2 hydrocarbons containing a consecutive number of carbon atoms, and (B) fluids comprising (i) at least about 95 weight percent hydrocarbons containing 10 or more carbon atoms and (ii) at least about 90 weight percent n-paraffins.

19 Claims, No Drawings

OTHER PUBLICATIONS

Freitas et al., "Shell Higher Olefins Process—SHOP," *Technical Bulletin Shell Chemical Company*, SC:335–84. (1984).

Gregor, J. H. "Fischer–Tropsch Products as Liquid Fuels or Chemicals," *Catalysis Letters* 7 (1990), pp. 317–331, J. C. Baltzer A. G., Scientific Pub. Co.

O'Connor et al., "Cetane Number Determination of Synthetic Diesel Fuels," *Fuel*, 1992, vol. 71, Nov., pp. 1323–1327.

Quann et al., "Chemistry of Olefin Oligomerization Over ZSM–5 Catalyst," *Ind. Eng. Chem. Res.*, vol. 27, 1988, pp. 565–570.

Sie et al., "Conversion of Natural Gas to Transportation Fuels via The Shell Middle Distillate Synthesis Process (SMDS)," *Catalysis Today*, 8 (1991) pp. 371–394, Elsevier Science Pub. V.B., Amsterdam.

Tabak et al., "Conversion of Propylene and Butylene Over ZSM–5 Catalyst," *AIChE Journal*, vol. 32, No. 9, Sep. 1986, pp. 1526–1531.

van der Burgst et al., "The Shell Middle Distillate Synthesis Process," The Institute of Petroleum, *Petroleum Review*, Apr. 1990, pp. 204–209.

Watson et al., *Journal of Industrial and Engineering Chemistry*, 27 (12); pp. 1460–1463, (Dec. 1935).

ADC/SPE 27450, presented at the 1994 IADC/SPE Drilling Conference in Dallas, Texas, (Feb. 15–16, 1994), pp. 181–182.

Nova Systems, The Environmentally Sound Alternative to Traditional Drilling Fluids, MI Drilling Fluids (1995).

Study on the Potential Toxic Effects of Using SARALINE Synthetic Based Drilling Mud in Vietnam, Vietnam Oil and Gas Corporation, pp. 1 and 25–28., no date available.

The Ultidrill System, An Advanced Synthetic Based Drilling Fluid from Schlumberger Dowell, (Oct. 1995).

SPE/IDAC 25754, Presentation at the 1993 SPE/IADC Drilling Conference held in Amsterdam Feb. 23–25, 1993, pp. 727–736.

Appendix 2 to Subpart A of Part 435—Drilling Fluids Toxicity Test, *Federal Register*/vol. 58, No. 41/ Thursday, Mar. 4, 1993, pp. 12504–12512 (40 CFR Part 435/12507).

Bleier et al., "Drilling Fluids: Making Peace with the Environment," Journal of Petroleum Technology, vol. 45, No. 1, pp. 6–10 (Jan. 1993).

Bleier, "Predicting Mud Toxicity," Journal of Petroleum Technology, vol. 43, No. 10, pp. 1192–1193 (Oct., 1991).

* cited by examiner

NON-TOXIC, INEXPENSIVE SYNTHETIC DRILLING FLUID

CROSS-REFERENCE TO RELATED APPLICATIONS

This application is a division of application Ser. No. 08/580,112, filed Jan. 29, 1996, now U.S. Pat. No. 5,958, 845, which is a continuation-in-part of application Ser. No. 08/494,441, filed Jul. 24, 1995, now abandoned, which is a continuation-in-part of application Ser. No. 08/422,476, filed Apr. 17, 1995, now U.S. Pat. No. 5,635,457, which applications are incorporated herein in their entireties by reference.

BACKGROUND

The present invention relates to wellbore fluids (especially, synthetic fluid-based drilling fluids) and systems and processes for using them in a subterranean formation in oil and gas recovery operations.

While drilling fluids employing synthetic fluids (such as polyalphaolefin- and ester-based drilling fluids) as the base fluid are capable of achieving 96 hour $LC_{50}$ Mysid shrimp (*Mysidopsis bahia*) bioassay test results greater than 100,000 ppm, their commercial use has been severely restricted because of the high cost of the synthetic fluids.

SUMMARY OF THE INVENTION

Accordingly, there is a need for a drilling fluid which employs an inexpensive, non-toxic synthetic fluid as the base fluid. The present invention satisfies this need by providing a drilling fluid comprising (a) at least one drilling fluid additive (e.g., an emulsifier, a viscosifier, a weighting agent, and an oil-wetting agent) and (b) an inexpensive, non-toxic base fluid. In one embodiment of the invention, the base fluid is a synthetic fluid having a pour point greater than about −30° C. (−22° F.) and comprising (i) at least about 95 weight percent hydrocarbons containing 11 or more carbon atoms, (ii) greater than 5 weight percent hydrocarbons containing 18 or more carbon atoms, (iii) at least about 50 weight percent isoparaffins, (iv) at least about 90 weight percent total paraffins, (v) at least 2 hydrocarbons containing a consecutive number of carbon atoms, (vi) less than about 1 weight percent naphthenics, and (vii) less than about 0.1 volume percent aromatics. (This synthetic fluid is referred to hereinafter as the "isoparaffin synthetic fluid.")

In another embodiment, the synthetic fluid comprises (1) at least about 95 weight percent hydrocarbons containing 10 or more carbon atoms and (2) at least about 90 weight percent n-paraffins. (This synthetic fluid is referred to hereinafter as the "n-paraffin synthetic fluid.") The n-paraffins usually also contain (i) less than about 10 weight percent naphthenics and (ii) less than about 0.1 volume percent aromatics.

Typically, both the isoparaffin and n-paraffin synthetic fluids contain (i) less than about 1 weight percent sulfur, (ii) less than about 1 weight percent nitrogen, and (iii) less than about 1 weight percent oxygenated compounds.

The cost of the synthetic fluids employed in the present invention is comparable to that of diesel because the synthetic fluids are made by reacting inexpensive raw materials (e.g., $H_2$ and CO) on a massive scale designed to supply synthetic substitutes for gasoil and/or kerosene produced at conventional oil refineries. In contrast, polyalphaolefins and esters are made by polymerizing or reacting expensive raw materials on a small or moderate scale.

Because prior toxicity studies have shown that aromatics, sulfur, nitrogen, and oxygenated compounds can be toxic, the low or substantially non-existent concentrations of these materials in the synthetic fluids used in the present invention is very desirable. In addition, the fluids employed in the present invention which are in fact made synthetically are also desirable in view of anticipated environmental regulations which may restrict the off-shore discharge of non-aqueous-base drilling fluids to those drilling fluids using a synthetically produced base fluid.

A drilling system and a method for drilling a borehole are also provided by the invention. The drilling system comprises (a) at least on& subterranean formation, (b) a borehole penetrating a portion of at least one of the subterranean formations, (c) a drill bit suspended in the borehole, and (d) the above drilling fluid located in the borehole and proximate the drill bit. The drilling method comprises the steps of (a) rotating a drill bit at the bottom of the borehole and (b) introducing the aforesaid drilling fluid into the borehole (i) to pick up drill cuttings and (ii) to carry at least a portion of the drill cuttings out of the borehole.

DETAILED DESCRIPTION OF THE INVENTION

At least 95 weight percent of the isoparaffin synthetic drilling fluid is commonly composed of compounds containing 11 or more, and more commonly 12 or more, carbon atoms. Also, the isoparaffin synthetic fluid consists of greater than 5, typically greater than 10, more typically greater than 15, even more typically greater than 20, and most typically greater than 25, weight percent compounds containing more than 17 carbon atoms. In fact, compounds containing 18 or more carbon atoms can constitute about 30, 35, 40, 45, or even 50 or more weight percent of the isoparaffin synthetic fluid. In addition, the isoparaffin synthetic fluid can contain isoparaffin, naphthenic, aromatic, sulfur, nitrogen, oxygenate, and total paraffin compounds in concentrations independently set forth in the following Table I.

TABLE I

| Isoparaffin Synthetic Fluid Composition | | | | | | | |
|---|---|---|---|---|---|---|---|
| Iso-paraffin[a], wt % | Naphthenic[b], wt % | Aromatic[c], v % | Sulfur[d], wt % | Nitrogen[e], wt % | Oxygenate[f], wt % | Total Paraffin[g], wt % | Normal Paraffin[h], wt % |
| ≧50 | ≦1 | ≦0.1 | ≦1 | ≦1 | ≦1 | ≧90 | ≧5 |
| ≧55 | ≦0.5 | ≦0.05 | ≦0.5 | ≦0.5 | ≦0.5 | ≧91 | ≧10 |
| ≧60 | ≦0.1 | ≦0.01 | ≦0.1 | ≦0.1 | ≦0.1 | ≧92 | ≧15 |
| ≦65 | ≦0.05 | ≦0.005 | ≦0.05 | ≦0.05 | ≦0.05 | ≧93 | ≧20 |
| ≦70 | ≦0.01 | ≦0.001 | ≦0.01 | ≦0.01 | ≦0.01 | ≧94 | ≧25 |
| ≦75 | ≦0.005 | ≦0.0005 | ≦0.005 | ≦0.005 | ≦0.005 | ≧95 | ≧30 |

TABLE I-continued

Isoparaffin Synthetic Fluid Composition

| Iso-paraffin[a], wt % | Naphthenic[b], wt % | Aromatic[c], v % | Sulfur[d], wt % | Nitrogen[e], wt % | Oxygenate[f], wt % | Total Paraffin[g], wt % | Normal Paraffin[h], wt % |
|---|---|---|---|---|---|---|---|
| ≤80 | ≤0.001 | ≤0.0001 | ≤0.001 | ≤0.001 | ≤0.001 | ≥96 | ≥35 |
| ≤85 | ≤0.0005 | — | ≤0.0005 | ≤0.0005 | ≤0.0005 | ≥97 | ≥40 |
| ≤90 | ≤0.0001 |  | ≤0.0001 | ≤0.0001 | ≤0.0001 | ≥98 | ≤45 |
| ≤95 |  |  |  |  |  | ≥99 | ≤50 |
|  |  |  |  |  |  | ≥99.5 |  |

[a]As determined by UMT 407-90.
[b]As determined by UTM 407-90.
[c]As determined by ASTM D 5186.
[d]As determined by ASTM D 2622.
[e]As determined by ASTM D 4629.
[f]As determined by UTM 484.
[g]As determined by UMT 407-90.
[h]As determined by UMT 407-90.

The pour point of the isoparaffin synthetic fluid (as determined by ASTM D 97) is commonly greater than about −30° C. (−22° F.), more commonly greater than about −25° C. (−13° F.), even more commonly greater than about −20° C. (−4° F.), and most commonly greater than about −15° C. (5° F.). Usually, the pour point of the isoparaffin synthetic fluid is less than about 6° C. (43° F.), preferably less than about 3° C. (37° F.), more preferably less than about 0° C. (32° F.), and most preferably less than about −3° C. (27° F.).

The flash point of the isoparaffin synthetic fluid (as determined by the Cleveland Open Cup method) is at least about 65.6° C. (150° F.), typically at least about 71.1° C. (160° F.), more typically about 76.7° C. (170° F.), even more typically at least about 82.2° C. (180° F.), and most typically at least about 85° C. (185° F.). Usually, the flash point of the isoparaffin synthetic fluid is less than about 121.1° C. (250° F.), lore typically about 118.3° C. (245° F.) or less, even more typically about 115.6° C. (240° F.) or less, and most about 112.8° C. (235° F.) or less.

As measured by ASTM D 93, the flash point of the isoparaffin synthetic fluid is at least about 65.6° C. (150° F.), typically at least about 71.1° C. (160° F.), more typically about 76.7° C. (170° F.), even more typically at least about 82.2° C. (180° F.), and most typically at least about 85° C. (185° F.), but usually less than about 115° C. (239° F.), more typically about 110° C. (230° F.) or less, even more typically about 105° C. (221° F.) or less, and most about 100° C. (212° F.) or less.

The isoparaffin synthetic fluid frequently has an initial boiling point (as determined by ASTM D 86) of at least about 160° C. (320° F.), more frequently at least about 165° C. (329° F.), even more frequently at least about 170° C. (338° F.), and most frequently at least about 175° C. (347° F.) or even at least about 180° C. (356° F.). In addition, the isoparaffin synthetic fluid commonly has a final boiling point (as determined by ASTN D 86) of at least about 340° C. (644° F.), more commonly at least about 345° C. (653° F.), even more commonly at least about 350° C. (662° F.), and most commonly at least about 351° C. (663.8° F.). Furthermore, the final boiling point of the isoparaffin synthetic fluid is typically about 375° C. (707° F.) or less, more typically about 370° C. (698° F.) or less, even more typically about 365° C. (689° F.) or less, and most typically about 360° C. (680° F.) or less.

The viscosity of the isoparaffin synthetic fluid at 40° C. (104° F.) (as measured by ASTM D 445) is ordinarily between about 1 to about 10 centistokes (cst). Preferably, the viscosity of the isoparaffin synthetic fluid at 40° C. (104° F.) is less than about 6, more preferably less than about 5, even more preferably less than about 4.5 and lost preferably less than about 4, cst.

At 15° C., the isoparaffin synthetic fluids commonly have an API gravity greater than about 40°, more commonly greater than about 42°, even more commonly greater than about 44°, and most commonly greater than about 46°.

The cetane index (as determined by ASTK D 976) is generally greater than about 60, preferably greater than about 62, more preferably greater than about 64, even more preferably greater than about 66, and most preferably greater than about 68. In fact, the cetane index is frequently at least about 70, 71, 73, 74, 75, 76, about 77 or more.

An isoparaffin synthetic fluid commercially available from KDS(Nalaysia) typically has the properties set forth in the following Table II.

TABLE II

Typical Properties of MDS (Malaysia) Isoparaffin Synthetic Fluid

| Property | Typical | Max | Min | Test Method |
|---|---|---|---|---|
| Density at 15° C., kg/m³ | 738 | 790 |  | ASTM D 1298 |
| ASTM Color | 0 | 2.0 |  | ASTM D 1500 |
| Distillation Range, ° C. |  |  |  | ASTM D 86 |
| IBP | 201 |  | 175 |  |
| 5% | 219 |  |  |  |
| 50% | 271 |  |  |  |
| 90% |  | 350 |  |  |
| 95% | 353 |  |  |  |
| FBP | 358 | 360 |  |  |
| Sulphur, ppm | 0 | 500 |  | ASTM D 1266 |
| Cetane Index | 75 |  | 70 | ASTM D 976 |
| Flash Point, ° C. | 88 |  | 68 | ASTM D 93 |
| Pour Point, ° C. | −7 |  |  | ASTM D 97 |
| Cloud Point, ° C. | −2 |  |  | ASTM D 2500 |
| CFPP, ° C. | −3 |  |  | IP 309 |
| Kinematic Viscosity at 40° C., cSt | 4.3 |  |  | ASTM D 445 |
| Aromatics, % v | <0.1 |  |  | ASTM D 5186 |
| API Gravity at 15° C., ° | 48.75 |  |  |  |

An interesting characteristic of the isoparaffin synthetic fluid described in above Table II is that mono- and polymethyl isomers typically constitute at least about 90, more typically at least about 92, even more typically at least about 94, and most typically at least about 96, weight percent of the C11 or less isoparaffinic content of the isoparaffin synthetic fluid. In fact, the mono- and poly-methyl isomers of isoparaffins containing 11 or less carbon atoms can constitute 97, 98, or oven 99, weight percent of the isoparaffin hydrocarbons having up to 11 carbon atoms. In other words, for the isoparaffin synthetic fluid reported in Table II, isoparaffins whose branched moieties contain more than one carbon atom (e.g., have an ethyl, propyl, butyl, or larger substituent group) constitute a negligible portion of the total amount of isoparaffins containing 11 or less carbon atoms.

Two other isoparaffin synthetic fluids commercially available from MDS (Malaysia) typically have the properties set forth in the following Table III.

TABLE III

Typical Properties of MDS (Malaysia) Isoparaffin Synthetic Fluid

| Property | Fluid A | Fluid B | Test Method |
|---|---|---|---|
| Density at 15° C., kg/m$^3$ | 738.8 | 784.2 | ASTM D 1298 |
| ASTM Color | <0.5 | <0.5 | ASTM D 1500 |
| Distillation Ranqe, ° C. | | | ASTM D 86 |
| IBP | 207.1 | 217.4 | |
| FBP | 351.4 | 353.8 | |
| Sulphur, ppm | >50 | >50 | ASTM D 1266 |
| Cetane Index | 77.5 | 75.5 | ASTM D 976-91 |
| Flash Point, ° C. | 86 | 97 | ASTM D 93-90 |
| Pour Point, ° C. | <0 | <0 | ASTM D 97-87 |
| Kinematic Viscosity at 40° C., cSt | 3.4 | 3.5 | ASTM D 445 |
| Aromatics, % v | <0.1 | <0.1 | UV method |

Another isoparaffin synthetic fluid, which is commercially available from Sasol, has the properties shown in the following Table IV.

TABLE IV

Typical Sasol Brand Isoparaffin Synthetic Fluid Properties

| Property | Value | Test Method |
|---|---|---|
| Density at 20° C., kg/l | 0.778–0.785 | ASTM D 1298 |
| Color, Saybolt | +30 | ASTM D 156 |
| Distillation Ranqe at 101.3 Kpals | | ASTM D 1078 |
| IBP, ° C. | 200 min. | |
| FBP, ° C. | 250 max. | |
| Sulphur, % mass | <0.01 | ASTM D 2622 |
| Flash Point (closed cup at 101.3 kPa), ° C. | 77 | IP 170 |
| Kinematic Viscosity at 40° C. | 1.6–2.1 | ASTM D 445 |
| Aromatics, % mass | 1 max. | GC |
| Water, % mass | 0.01 | ASTM D 1744 |
| Acidity, mgKOH/G | 0.01 | ASTM D 3242 |
| Ash, % mass | 0.01 | ASTM D 482 |
| Ionol content, mg/kg | 900–1100 | GC |

When the isoparaffin synthetic fluids are employed as the base fluid in a drilling mud, the base oil generally contains less than 1, preferably less than about 0.9, more preferably less than 0.8, even more preferably less than about 0.7, and most preferably less than about 0.6, weight percent polar activator (e.g., polar ether alcohols). In fact, the concentration of polar activators in the base fluid is commonly less than about 0.5, more commonly less than about 0.4, even more commonly less than about 0.3, and most commonly less than about 0.2, weight percent. In addition, the base fluid can contain less than about 0.1, 0.05, 0.01, 0.05, 0.001, weight percent polar activator or even be totally devoid of any polar activator. Furthermore, when the base fluid is the isoparaffin synthetic fluid, the entire drilling mud usually contains less than 1, preferably less than about 0.75, sore preferably less than 0.5, even more preferably less than about 0.25, and most preferably less than about 0.1, weight percent polar activator. In fact, in such instances the drilling mud can contain less than about 0.05, 0.01, 0.005, 0.001, weight percent polar activator or be entirely devoid of any polar activator.

With respect to the n-paraffin synthetic fluid, at least 95 weight percent of the n-paraffin synthetic drilling fluid is generally composed of compounds containing 10 or more carbon atoms. Typically, at least 95 weight percent of the n-paraffin synthetic drilling fluid is composed of compounds containing 11 or more, more typically 12 or lore, even more typically 13 or more, and most typically 14 or more carbon atoms. Usually, the n-paraffin synthetic fluid contains less than about 5, more commonly less than 3, even more commonly less than about 2, and most commonly less than about 1, weight percent of compounds containing 18 or more carbon atoms. In addition, the n-paraffin synthetic fluid can contain n-paraffin, iso-paraffin, naphthenic, aromatic, sulfur, nitrogen, and oxygenate compounds in concentrations independently listed in the following Table V.

TABLE V

N-paraffin Synthetic Fluid Composition

| N-paraffin[a], wt % | Naphthenic[b], wt % | Aromatic[c], v % | Sulfur[d], wt % | Nitrogen[e], wt % | Oxygenates[f], wt % | Isoparaffins[g], wt % |
|---|---|---|---|---|---|---|
| ≧90 | ≦10 | ≦0.1 | ≦1 | ≦1 | ≦1 | ≦10 |
| ≧91 | ≦5 | ≦0.05 | ≦0.5 | ≦0.5 | ≦0.5 | ≦9 |
| ≧92 | ≦1 | ≦0.01 | ≦0.1 | ≦0.1 | ≦0.1 | ≦8 |
| ≧93 | ≦0.5 | ≦0.005 | ≦0.05 | ≦0.05 | ≦0.05 | ≦7 |
| ≧94 | ≦0.1 | ≦0.001 | ≦0.01 | ≦0.01 | ≦0.01 | ≦6 |
| ≧95 | ≦0.05 | ≦0.0005 | ≦0.005 | ≦0.005 | ≦0.005 | ≦5 |
| ≧96 | ≦0.01 | ≦0.0001 | ≦0.001 | ≦0.001 | ≦0.001 | ≧4 |

TABLE V-continued

N-paraffin Synthetic Fluid Composition

| N-paraffin[a], wt % | Naphthenic[b], wt % | Aromatic[c], v % | Sulfur[d], wt % | Nitrogen[e], wt % | Oxygenates[f], wt % | Isoparaffins[g], wt % |
|---|---|---|---|---|---|---|
| ≧97 | ≦0.005 ≦0.001 ≦0.0005 ≦0.0001 | — | ≦0.0005 ≦0.0001 | ≦0.0005 ≦0.0001 | ≦0.0005 ≦0.0001 | ≧3 ≧2 ≧1 |

[a]As determined by UMT 407-90.
[b]As determined by UTM 407-90.
[c]As determined by ASTM D 5186.
[d]As determined by ASTM D 2622.
[e]As determined by ASTM D 4629.
[f]As determined by UTM 484.
[g]As determined by UMT 407-90.

The pour point of the n-paraffin synthetic fluid (as determined by ASTM D 97) is commonly greater than about −30° C. (−22° F.) and more commonly greater than about −23° C. (−13°F.). Frequently, the pour point of the n-paraffin synthetic fluid is less than about 10° C. (50° F.), more frequently less than about 9° C. (48.2° C.), even more frequently less than about 8° C. (46.4° F.), and most frequently less than about 7° C. (44.6° F.).

The flash point of the n-paraffin synthetic fluid (as determined by ASTM D 93) is typically at least about 65° C. (149° F.), more typically at least about 70° C. (158° F.), even more typically at least about 73° C. (167° F.), and most typically at least about 80° C. (176° F.). The n-paraffin synthetic fluids can have even higher flash points, such as at least about 85° C. (185° F.), 90° C. (194° F.), 95° C. (203° F.), or at least about 100° C. (212° F.) or higher.

The n-paraffin synthetic fluid frequently has an initial boiling point (as determined by ASTK D 86) of at least about 190° C. (374° F.), more frequently at least about 200° C. (392° F.), even more frequently at least about 210° C. (410° F.), and most frequently at least about 220° C. (428° F.). Even higher initial boiling points, such as about 230° C. (446° F.), 240° (464° F.), or 250° C. (482° F.) or more, are not unusual for the n-paraffin synthetic fluids.

The viscosity of the n-paraffin synthetic fluid at 40° C. (104° F.) (as measured by ASTH D 445) is ordinarily between about 1 to about 10 cot. Preferably, the viscosity of the n-paraffin synthetic fluid at 40° C. (104° F.) is less than about 5, more preferably less than about 4, even more preferably less than about 3, and most preferably less than about 2, cst.

At 15° C., the n-paraffin synthetic fluids commonly have an API gravity greater than about 45°, more commonly greater than about 50°, even more commonly greater than about 50.5°, and most commonly greater than about 51°.

Typical properties for some commercially available n-paraffin synthetic fluids are shown in the following Tables VI and VII.

TABLE VI

Typical Properties of MDS (Malaysia) Brand N-paraffin Synthetic Fluids

| Property | Sarapar 103 | Sarapar 147 | Test Method |
|---|---|---|---|
| Saybolt Color | +30 | +30 | ASTM D 156 |
| Bromine Index, mgBr/100 g | 8 | 6 | ASTM D 2710 |
| Sulphur, ppm | 0 | 0 | ASTM D 5120 |
| Carbon Distribution, % mass | | | |
| nC9 | 0 | 0 | |
| nC10 | 9 | 0 | |
| nC11 | 30 | 0 | |
| nC12 | 29 | 0 | |
| nC13 | 27 | 4 | |
| nC14 | 1 | 25 | |
| nC15 | 0 | 24 | |
| nC16 | 0 | 22 | |
| nC17 | 0 | 16 | |
| nC18 | 0 | 4 | |
| nC19 | 0 | 0 | |
| n-Paraffin content, mass | 96 | 95 | |
| Average Molecular Mass | 167 | 213 | |
| Density at 15° C., kg/M$^3$ | 750 | 775 | ASTM D 4052 |
| Distillation Ranqe, ° C. | | | ASTM D 86 |
| IBP | 190 | 250 | |
| FBP | 230 | 280 | |
| Flash Point, ° C. | 75 | 110 | ASTM D 93 |
| Pour Point, ° C. | −20 | 5 | ASTM D 97 |
| Viscosity at 25° C., mm/s | 1.7 | 3.3 | ASTM D 445 |
| API Gravity at 15° C., ° | 57.17 | 51.08 | |

TABLE VII

Typical Properties Of Sasol Brand N-paraffin Synthetic Fluids

| | Paraffins | | | | |
| --- | --- | --- | --- | --- | --- |
| | Light | | Heavy | | |
| Property | Specification | Typical | Specification | Typical | Test Method |
| n-Paraffins, % mass | 92 min. | 93 | 92 min. | 93 | Sasol 11.28/83 |
| Aromatics, % mass | 0.5 max. | <0.1 | 0.5 max. | <0.1 | Sasol 5.107/92 |
| Bromine Index, mg Br/100 g | 20 max. | <10 | 20 max. | <10 | ASTM D 2710-89 |
| Sulphur, ppm | 5 max. | <1 | 5 max. | <1 | ANTEK 1.211/92 |
| Acidity, mg KOH/g | 0.02 max. | <0.01 | 0.02 max. | <0.01 | ASTM D 3242 |
| Ash, % mass | 0.03 max. | <0.01 | 0.03 max. | <0.01 | ASTM D 482 |
| Saybolt Color | +30 min. | +30 | +25 min | +30 | ASTM D 156 |
| Carbon Distribution, % mass | | | | | Sasol 11.28/83 |
| C9 and lighter | 0.5 max. | <0.1 | | | |
| C10 | 4–10 | 5 | | | |
| C11 | 30–38 | 35 | | | |
| C12 | 29–37 | 32 | | | |
| C13 | 23–30 | 28 | | | |
| C14 and heavier | 0.5 max. | 0.2 | | | |
| C13 and lighter | | | 0.5 max. | 3.5 | |
| C14 and heavier | 0.5 max. | 0.2 | | | |
| C13 and lighter | | | 0.5 max. | 3.5 | |
| C14–C17 | | | 95 min. | 96 | |
| C18 and heavier | | | 1 max. | 0.3 | |
| Boiling Range, ° C. | | 192–226 | | 254–287 | |
| Pour Point, ° C. | | <0 | | 3 | |
| Flash Point, ° C. | | 70 | | 114 | |
| Average Molecular Mass | | 163 | | 219 | |
| Density at 25° C., kg/l | | 0.744 | | | |
| API Gravity at 25° C., ° | | 58.43 | | | |
| Viscosity at 40° C., cst | | | | 2.4 | |

The synthetic fluids of the present invention are prepared by the Fischer-Tropsch process and various modifications thereof (especially the Shell Middle Distillate Synthesis process). See, for example, Sie at al., *Catalysis Today*, 8:371–394 (1991); van der Burgt et al., *Petroleum Review*, pages 204–209 (April 1990); *Oil & Gas Journal*, pages 74–76 (Feb. 17, 1986); Eilers et al., *Catalysis Letters*, pages 253–270 (1990); Bartholomew, *Catalysis Letters*, pages 303–316 (1990); Gregor, *Catalysis Letters*, pages 317–332 (1990); Dry, *Journal of Organometallic Chemistry*, 372:117–127 (1989); Dry, *Applied Industrial Catalysis*, 2:167–213 (1983); and Dry, *Hydrocarbon Processing*, pages 121–124 (August 1982), these publications being incorporated herein in their entireties by reference. In general, the Fischer-Tropsch process entails reacting carbon monoxide and hydrogen over a catalyst (e.g., iron, ruthenium, or cobalt) to produce products which, in the absence of secondary transformations, are highly linear. When desired, some or all of the linear products are subjected to a conversion process (such as the Shell Middle Distillate Synthesis Process) where (a) olefins present in the Fischer-Tropsch product are hydrogenated, (b) small amounts of oxygen-containing compounds, mainly primary alcohols, are removed, (c) the Fischer-Tropsch product is hydroisomerized, and (d) the n-paraffins are hydrocracked to isoparaffins of a desired chain length and/or boiling range.

Due to the manner in which they are synthesized, the synthetic fluids are composed of hydrocarbons containing a consecutive number of carbon atoms (i.e., a mixture of hydrocarbons where the carbon atom content of the individual hydrocarbons is $C_n$, $C_{n+1}$, $C_{n+2}$, $C_{n+3}$, etc. and n is a whole number.) Generally, the synthetic fluids are composed of at least 2, more commonly at least 3, even more commonly at least 4, and most commonly at least 5 hydrocarbons containing a consecutive number of carbon atoms. In fact, some synthetic fluids contain at least 6, 7, 8, 9, or 10 or more hydrocarbons having a consecutive number of carbon atoms.

The synthetic fluids are commercially available from Sasol in South Africa and Shell Middle Distillate in Malaysia and are preferably the fraction which has a boiling range similar to gasoils and/or kerosenes produced at conventional petroleum refineries.

Optionally, one or more pour point depressants are employed in the synthetic fluids of the present invention to lower their pour point. Typical pour point depressants include, but are not limited to, ethylene copolymers, isobutylane polymers, polyaklylnaphthalenes, wax-aromatic condensation products (e.g., wax-naphthalene condensation products, phenol-wax condensation products), polyalkylphenoleosters, polyalkylmethacrylates, polymethacrylates, polyalkylated condensed aromatics, alkylaromatic polymers, iminodiimides, and polyalkylstyrene. (The molecular weights for polyaklylnaphthalenes, polyalkylphenolesters, and polyalkylmethacrylates range from about 2,000 to about 10,000.) Because they are non-toxic, ethylene copolymers and isobutylene polymers are the preferred pour point depressants.

Up to about 1 weight percent pour point depressant is employed. (As used in the specification and claims, the weight percent of the pour point depressant is based upon the weight of the synthetic fluid, i.e., it is the weight of the pour point depressant divided by the weight of the synthetic fluid, the quotient being multiplied by 100%.) Preferably, the pour point depressant is employed in a concentration of 0.005 to about 0.5, more preferably about 0.01 to about 0.4, and most preferably about 0.02 to about 0.3, weight percent.

When employed, the pour point depressant is preferably mixed with the synthetic fluid and the resulting composition is then combined with any additional additives as described below.

One or more surfactants (e.g., emulsifiers, wetting agents), viscosifiers, weighting agents, fluid loss control agents, and shale inhibiting salts are also optionally used in the drilling fluid of the present invention. (As used in the specification and claims, the term "surfactant" means a substance that, when present at low concentration in a system, has the property of adsorbing onto the surfaces or interfaces of the system and of altering to a marked degree the surface or interfacial free energies of those surfaces (or interfaces). As used in the foregoing definition of surfactant, the term "interface" indicates a boundary between any two immiscible phases and the term "surface" denotes an interface where one phase is a gas, usually air.) Because the drilling fluids of the present invention are intended to be non-toxic, these optional ingredients, like the synthetic fluid, are preferably also non-toxic.

Exemplary emulsifiers include, but are not limited to, fatty acids, soaps of fatty acids, and fatty acid derivatives including amido-amines, polyamides, polyamines, esters (such as sorbitan monoleate polyethoxylate, sorbitan dioleate polyethoxylate), imidaxolines, and alcohols.

Typical wetting agents include, but are not limited to, lecithin, fatty acids, crude tall oil, oxidized crude tall oil, organic phosphate esters, modified imidazolines, modified amidoamines, alkyl aromatic sulfates, alkyl aromatic sulfonates, and organic esters of polyhydric alcohols.

Exemplary weighting agents include, but are not limited to barite, iron oxide, gelana, siderite, and calcium carbonate.

Common shale inhibiting salts are alkali metal and alkaline-earth metal salts. Calcium chloride and sodium chloride are the preferred shale inhibiting salts.

Exemplary viscosifiers include, but are not limited to, organophilic clays (e.g., hectorite, bentonite, and attapulgite), non-organophilic clays (e.g., montmorillonite (bentonite), hectorite, saponite, attapulgite, and illite), oil soluble polymers, polyamide resins, and polycarboxylic acids and soaps. (As used in the specification and claims, the term "non-organophilic clay" means a clay which has not been amine-treated to convert the clay from water-yielding to oil-yielding.)

Illustrative fluid loss control agents include, but are not limited to, asphaltics (e.g., asphaltenes and sulfonated asphaltenes), amine treated lignite, and gilsonite. For drilling fluids intended for use in high temperature environments (e.g., where the bottom hole temperature exceeds about 204.4° C. (400° F.)), the fluid loss control agent is preferably a polymeric fluid loss control agent. Exemplary polymeric fluid loss control agents include, but are not limited to, polystyrene, polybutadiene, polyethylene, polypropylene, polybutylene, polyisoprene, natural rubber, butyl rubber, polymers consisting of at least two monomers selected from the group consisting of styrene, butadiene, isoprene, and vinyl carboxylic acid. Individual or mixtures of polymeric fluid loss control agents can be used in the drilling fluid of this invention.

For drilling fluids intended for use in high temperature environments (e.g., where the bottom hole temperature exceeds about 204.4° C. (400° F.)), it is desirable to use the synthetic fluid as the bass material in conjunction with the formulations and materials disclosed in U.S. patent applications Ser. No. 07/786,034 and Ser. No. 08/268,801, which applications are incorporated herein in their entireties by reference.

General drilling fluid formulations are set forth in the following Table VIII:

TABLE VIII

| Ingredient | Typical | More Typical |
|---|---|---|
| Synthetic fluid, volume %[a] | 25–85 | 40–60 |
| Surfactant (active), | | |
| ppb[b] | 0.5–40 | 3–25 |
| kg/m$^3$ | 2.86–57.2 | 2.86–28.6 |
| Water, volume %[a] | up to 45 | 1–20 |
| Weighting agent, | | |
| ppb | up to 700 | 150–600 |
| kg/m$^3$ | up to 2002 | 429–1716 |
| Polymer viscosifier, | | |
| ppb | 0.05–15 | 0.1–6 |
| kg/m$^3$ | 0.143–42.9 | 0.286–17.16 |
| Organophilic clay, | | |
| ppb | up to 15 | 0.1–6 |
| kg/m$^3$ | up to 42.9 | 0.286–17.16 |
| Shale inhibiting salt, | | |
| ppb | up to 60 | 5–30 |
| kg/m$^3$ | up to 171.6 | 143–85.8 |
| Lime[c], | | |
| ppb | up to 30 | 1–20 |
| kg/m$^3$ | up to 85.8 | 2.86–57.2 |
| Fluid loss control agent, | | |
| ppb | up to 30 | 2–20 |
| kg/m$^3$ | up to 85.8 | 5.72–57.2 |

[a]Volume percent is based on the total volume of the drilling fluid.
[b]The pounds per barrel (ppb) is based upon the final composition of the drilling fluid.
[c]As used in the specification and claims, the term "lime" means quicklime (CaO), quicklime precursors, and hydrated quicklime (e.g., slaked lime (Ca(OH)$_2$)).

The properties (e.g., synthetic fluid to water ratio, density, etc.) of the drilling fluids of the invention can be adjusted to suit any drilling operation. For example, the drilling fluid is usually formulated to have a volumetric ratio of synthetic fluid to water of about 100:0 to about 40:60 and a density of about 0.9 kg/l (7.5 pounds per gallon (ppg)) to about 2.4 kg/l (20 ppg). More commonly, the density of the drilling fluid is about 1.1 kg/l (9 ppg) to about 2.3 kg/l (19 ppg).

The drilling fluids are preferably prepared by mixing the constituent ingredients in the following order: (a) synthetic fluid, (b) emulsifier, (c) line, (d) fluid loss control agent, (e) an aqueous solution comprising water and the shale inhibiting salt, (f) organophilic clay (when employed), (g) oil wetting agent, (h) weighting agent, (i) non-sulfonated polymer, (j) sulfonated polymer (when employed), and (k) non-organophilic clay (when employed).

EXAMPLES

The following examples (which are intended to illustrate and not limit the invention defined by the claims) demonstrate the preparation of exemplary drilling fluids within the scope of the present invention (Examples 1–7), show the results obtained from an analysis of an isoparaffin synthetic fluid sample (Example 8), document initial and aged rheological properties of a drilling fluid which employs the isoparaffin synthetic fluid sample as the base fluid (Example 9), and compare the toxicity of two drilling fluids which solely differ in that the base fluid of one is the isoparaffin synthetic fluid sample and the base fluid of the other is the diner of 1-decene (a commercially used, non-toxic base fluid).

Examples 1–6

Preparation of Drilling Fluids

Six drilling fluids (3 lab barrels per drilling fluid formulation, with each lab barrel containing about 350 ml) having a density of about 2.16 kg/l (about 18 ppg) and within the scope of the present invention are formulated by sequentially adding ingredients in the order set forth in Table A. After the addition of each ingredient, the resulting composition is mixed for the indicated mixing time prior to adding a subsequent ingredient to the composition.

TABLE A

| Component | 1 | 2 | 3 | 4 | 5 | 6 | Mixing Time, minutes |
|---|---|---|---|---|---|---|---|
| Synthetic fluid, ml | 164.5 | 164.5 | 164.5 | 164.5 | 164.5 | 164.5 | |
| Primary emulsifier, ml | 8.5 | 8.5 | 8.5 | 8.5 | 8.5 | 8.5 | |
| Lime, g | 8.0 | 8.0 | 8.0 | 8.0 | 8.0 | 8.0 | |
| Fluid loss control agent, g | 10.0 | 10.0 | 10.0 | 10.0 | 10.0 | 10.0 | 20 |
| Brine solution | | | | | | | 10 |
| $CaCl_2$, g | 12.1 | 12.1 | 12.1 | 12.1 | 12.1 | 12.1 | |
| Water, ml | 23.8 | 23.8 | 23.8 | 23.8 | 23.8 | 23.8 | |
| Organophilic clay, g | 1.0 | 2.0 | 3.0 | 2.0 | 2.0 | 1.0 | 20 |
| Oil wetting agent, ml | 6.0 | 6.0 | 6.0 | 6.0 | 6.0 | 6.0 | 10 |
| Weighting Agent, g | 572 | 572 | 572 | 572 | 572 | 572 | 20 |
| Styrene-butadiene polymer, g | 0 | 0 | 0 | 0 | 0 | 2.0 | 10 |
| Polystyrene, g | 3.0 | 3.0 | 3.0 | 4.0 | 2.0 | 3.0 | 10 |
| Bentonite, g | 3.0 | 3.0 | 3.0 | 2.0 | 4.0 | 3.0 | 35 |

Example 7

Preparation Of Drilling Fluid

An invert emulsion drilling fluid is prepared by (a) initially agitating about 240 ml of a synthetic fluid for about 1 minute using a blender and (b) then sequentially adding the following ingredients (with continuous mixing for about one minute after the addition of each material): (i) about 6 g of a primary emulsifier; (ii) about 8 g of lime (calcium hydroxide); and (iii) about 4 g of a fluid-loss preventing agent.

Subsequently, about 39 ml of fresh water is added to the above mixture and the resulting composition is mixed for about ten minutes. Then, about 11 g of an amine-treated bentonite is added and the resulting mixture is agitated for about 15 minutes.

Thereafter, the following materials are added in sequence, with about 5 minutes of mixing after the addition of each of the materials: (i) about 2 g of a secondary emulsifier; (ii) about 210 g of powdered barite (a non-toxic weighting agent); (iii) about 24 g of calcium chloride dihydrate (to provide salinity to the water phase without water wetting the barite); and (iv) about 20 g of a powdered clay (composed of about 35 weight percent smectite and about 65 weight percent kaolinite) to simulate drilled formation particles.

Example 8

Analysis of Isoparaffin Synthetic Fluid Sample

Analytical results obtained from the analysis of an isoparaffin synthetic fluid sample from shell Malaysia by gas chromatography are reported in the following Tables B–D.

TABLE B

Carbon Number Distribution Results

| Carbon Number | Weight Percent Off |
|---|---|
| 8 | 0.31 |
| 9 | 0.41 |
| 10 | 0.84 |

TABLE B-continued

Carbon Number Distribution Results

| Carbon Number | Weight Percent Off |
|---|---|
| 11 | 1.86 |
| 12 | 4.61 |
| 13 | 6.22 |
| 14 | 7.13 |
| 15 | 8.33 |
| 16 | 8.38 |
| 17 | 9.43 |
| 18 | 11.04 |
| 19 | 10.95 |
| 20 | 10.39 |
| 21 | 8.23 |
| 22 | 5.95 |
| 23 | 3.43 |
| 24 | 1.51 |
| 25 | 0.64 |
| >25 | 0.34 |

TABLE C

Paraffin Distribution Results

| | Analytical Data | | Calculated Results |
|---|---|---|---|
| Carbon Content | n-Paraffin Wt. % | Iso-Paraffin Wt. % | Ratio of Iso/n Paraffin |
| 10 | 0.60 | 0.24 | 0.40 |
| 11 | 1.55 | 0.31 | 0.20 |
| 12 | 2.60 | 2.01 | 0.773 |
| 13 | 2.83 | 3.39 | 1.198 |
| 14 | 5.22 | 1.91 | 0.366 |
| 15 | 4.70 | 3.63 | 0.77 |
| 16 | 4.30 | 4.01 | 0.949 |
| 17 | 4.69 | 4.74 | 1.01 |
| 18 | 4.52 | 6.52 | 1.44 |

TABLE C-continued

Paraffin Distribution Results

| Analytical Data | | Calculated Results | |
| --- | --- | --- | --- |
| Carbon Content | n-Paraffin Wt. % | Iso-Paraffin Wt. % | Ratio of Iso/n Paraffin |
| 19 | 3.33 | 7.62 | 2.29 |
| 20 | 2.25 | 8.14 | 3.62 |
| 21 | 1.53 | 6.70 | 5.17 |
| 22 | 0.89 | 5.06 | 5.68 |
| 23 | 0.39 | 3.04 | 7.79 |
| 24 | 0.12 | 1.39 | 11.58 |
| 25 | 0.03 | 0.61 | 20.33 |
| 26 | 0.01 | 0.33 | 33 |
| 27 | 0.00 | | |
| 28 | 0.00 | | |
| Total | 39.53 | | |

Based upon the results listed in Table C, the iso-paraffin/n-paraffin ratio of the isoparaffin synthetic fluid sample for compounds containing from 17 to 20 carbon atoms follows the equation $y=(x-16)^{(0.53+0.2(x-18))}$, where x is the carbon number and y is the iso-paraffin/n-paraffin ratio. In addition, for compounds containing 21 to 25 carbon atoms, the iso-paraffin/n-paraffin ratio of the isoparaffin synthetic fluid sample follows the equation $y=(x-21)^{(1.48+0.25(x-23))}$, where x and y are as defined above. The foregoing equations are generally accurate within ±1 unit and even within ±0.5 unit.

TABLE D

Percent Off To Temperature Results

| | Temperature | | | Temperature | |
| --- | --- | --- | --- | --- | --- |
| Wt % Off | °C. | °F. | V % Off | °C. | °F. |
| 0.5 | 150.0 | 302 | 0.5 | 145.6 | 294 |
| 5.0 | 207.8 | 406 | 5.0 | 205.6 | 402 |
| 10.0 | 222.8 | 433 | 10.0 | 221.1 | 430 |
| 15.0 | 237.8 | 460 | 15.0 | 236.7 | 458 |
| 20.0 | 253.9 | 489 | 20.0 | 252.8 | 487 |
| 25.0 | 260.6 | 501 | 25.0 | 257.8 | 496 |
| 30.0 | 272.2 | 522 | 30.0 | 271.7 | 521 |
| 35.0 | 281.7 | 539 | 35.0 | 280.0 | 536 |
| 40.0 | 289.4 | 553 | 40.0 | 288.9 | 552 |
| 45.0 | 298.9 | 570 | 45.0 | 297.2 | 567 |
| 50.0 | 304.4 | 580 | 50.0 | 304.4 | 580 |
| 55.0 | 311.7 | 593 | 55.0 | 310.6 | 591 |
| 60.0 | 318.3 | 605 | 60.0 | 317.8 | 604 |
| 65.0 | 323.9 | 615 | 65.0 | 322.8 | 613 |
| 70.0 | 331.7 | 629 | 70.0 | 330.6 | 627 |
| 75.0 | 337.2 | 639 | 75.0 | 335.6 | 636 |
| 80.0 | 345.0 | 653 | 80.0 | 344.4 | 652 |
| 85.0 | 351.7 | 665 | 85.0 | 351.1 | 664 |
| 90.0 | 360.0 | 680 | 90.0 | 359.4 | 679 |
| 95.0 | 371.7 | 701 | 95.0 | 371.1 | 700 |
| 99.5 | 399.4 | 751 | 99.5 | 398.9 | 750 |

In addition, the gas chromatography analysis (both mass spectrometry and flame ionization detector (FID)) did not detect the presence of either aromatic or naphthenic compounds.

Example 9
Preparation And Testing of Isoparaffin Synthetic Fluid-Containing Drilling Fluid Each of two substantially identical samples of an oil-base drilling fluid within the scope of the present invention was formulated as follows. (The isoparaffin synthetic fluid sample analyzed in Example 8 was employed as the synthetic fluid.) Ingredients were sequentially added in the order sot forth below in Table E. After the addition of each ingredient, the resulting composition was mixed for the indicated mixing time prior to adding a subsequent ingredient to the composition.

TABLE E

| Component | | Mixing Time, minutes |
| --- | --- | --- |
| Synthetic Fluid, ml | 209 | |
| Imvitone brand organophilic clay, g | 7.0 | 30 |
| Novamul brand emulsifier, ml | 10.0 | |
| Novamod brand rheology modifier, g | 2.0 | 10 |
| Lime, g | 10.0 | 10 |
| Brine solution | | 30 |
| CaCl$_2$, g | 26.3 | |
| Water, ml | 51.3 | |
| Versatrol I brand fluid loss control agent, g | 10.0 | 15 |
| Barite, g | 269 | 30 |

One sample was used to check the initial rheological properties, and the other sample was used to test the aged rheological properties. The age-tested sample was placed into an aging bomb in the presence of about 790.8 kpascal (100 psi) nitrogen and rolled at about 176.7° C. (350° F.). After aging, the rheological properties of the age-tested sample were checked. Unless otherwise noted below in Table F, both the initial and age-tested rheological properties were measured at about at 48.90° C. (120° F.) according to procedures described in *Recommended Practice—Standard Procedure for Field Testing Drilling Fluids*, API Recommended Practice 13B-2 (RP 13B-2), Second Edition, Dec. 1, 1991, American Petroleum Institute, Washington, D.C. (hereinafter referred to as "API"), API being incorporated herein in its entirety by reference. The measured results are set forth in Table F.

TABLE F

Drilling Fluid Rheological Properties

| Property | Initial | Aged |
| --- | --- | --- |
| Dial reading[a], | | |
| 600 rpm | 103 | 106 |
| 300 rpm | 74 | 61 |
| 200 rpm | 59 | 48 |
| 100 rpm | 42 | 29 |
| 6 rpm | 20 | 8 |
| 3 rpm | 18 | 7 |
| Gel Strength[b], | | |
| 10 sec, lb/100 ft$^2$ | 19 | 7 |
| kg/10 m$^2$ | 9.3 | 3.4 |
| 10 min, lb/100 ft$^2$ | 23 | 37 |
| kg/10 m$^2$ | 11.2 | 18.0 |
| PV[c], cp | 29 | 45 |
| N-sec/m$^2$ (10$^3$) | 29 | 45 |
| YP[d], lb/100 ft$^2$ | 45 | 16 |
| kg/10 m$^2$ | 22.0 | 7.8 |
| HTHP fluid loss[e], ml | 2.8 | 2.8 |
| ES[f], volts | 814 | 593 |

TABLE F-continued

Drilling Fluid Rheological Properties

| Property | Initial | Aged |
|---|---|---|
| API fluid loss, ml | 1.5 | 0 |
| Cake | 0 | 0 |

[a] Dial readings were obtained using a 115-volt motor driven viscometer and measured according to the procedure described in API, pages 9–10, sections 2.4 to 2.5.
[b] Gel strength for 10 seconds and 10 minutes was determined in accordance with the procedure discussed in API, page 10, section 2.5, paragraphs f and g, respectively.
[c] PV was determined in accordance with the procedure and calculations discussed in API, page 10, sections 2.5 to 2.6.
[d] YP was determined in accordance with the procedure and calculations discussed in API, page 10, sections 2.5 to 2.6.
[e] HTHP denotes "high-temperature/high-pressure test" and was determined in accordance with the procedure discussed in API, pages 13–14, section 3.
[f] "ES" denotes "electrical stability" and was measured in accordance with the procedure discussed in API, pages 21–22, section 6.

Example 10
Toxicity Study

With one modification, another drilling fluid was prepared in accordance with the protocol set forth in preceding Example 9 using the isoparaffin synthetic fluid analyzed in Example 9 as the synthetic fluid. The sole modification consisted of using about ten times the amount of each ingredient in formulating the drilling fluid. The drilling fluid was subjected to the 96 hour $LC_{50}$ Mysid shrimp (*Mysidopsis bahia*) bioassay test by an independent laboratory and achieved a score of about $396 \times 10^3$.

Example 11
Comparative Toxicity Study

With two modifications, another drilling fluid was prepared in accordance with the protocol set forth above in Example 9. One modification entailed using the diner of 1-decene (the base synthetic fluid of Novadril brand non-toxic drilling fluid) as the synthetic fluid, and the other modification consisted of using about ten times the amount of each ingredient in formulating the drilling fluid. The drilling fluid was subjected to the 96 hour $LC_{50}$ Mysid shrimp (*Mysidopois bahia*) bioassay test by the same independent laboratory employed in Example 10 and achieved a score of about $207.6 \times 10^3$.

Since a higher numerical result obtained by the 96 hour $LC_{50}$ Mysid shrimp (*Mysidopois bahia*) bioassay test is indicative of lower toxicity of the material test, comparative Examples 10–11 indicate that a synthetic fluid within the &cope of the present invention is substantially less toxic than the commercially used Novadril brand synthetic fluid. The reason for this is that the number obtain by the exemplary synthetic fluid-containing drilling fluid is roughly about 1.9 times greater than that obtained by the Novadril-containing drilling fluid. In fact, the results documented in comparative Examples 10–11 are quite surprising and unexpected because conventional wisdom in the drilling fluids industry considers toxicity to increase with decreasing carbon content and the tested synthetic fluid within the scope of the present invention has a significantly higher concentration of hydrocarbons containing less than 20 carbon atoms than present in the Novadril brand synthetic fluid.

Example 12
Additional Analysis of Isoparaffin Synthetic Fluid Samples

Analytical results obtained from the analysis of two additional isoparaffin synthetic fluid samples from Shell Malaysia by gas chromatography are reported in the following Table G.

TABLE G

Carbon Number Distribution Results

| | Weight Percent Off | | | |
|---|---|---|---|---|
| Carbon | Total Organics | | N-Alkanes Only[a] | |
| Number | Sample A | Sample B | Sample A | Sample B |
| ≤6 | 0.02 | 0.05 | 0.013 | 0.023 |
| 7 | 0.07 | 0.14 | 0.050 | 0.096 |
| 8 | 0.23 | 0.39 | 0.161 | 0.25 |
| 9 | 0.59 | 0.78 | 0.354 | 0.42 |
| 10 | 0.93 | 1.21 | 0.55 | 0.66 |
| 11 | 1.42 | 2.15 | 0.67 | 1.05 |
| 12 | 5.17 | 7.57 | 1.96 | 3.33 |
| 13 | 7.49 | 10.21 | 2.17 | 3.17 |
| 14 | 9.22 | 10.16 | 3.60 | 2.74 |
| 15 | 9.00 | 8.99 | 3.87 | 2.43 |
| 16 | 9.26 | 7.84 | 4.35 | 2.19 |
| 17 | 9.30 | 8.59 | 4.46 | 3.01 |
| 18 | 13.45 | 11.21 | 5.78 | 4.37 |
| 19 | 11.53 | 9.83 | 4.61 | 3.64 |
| 20 | 7.57 | 7.60 | 2.95 | 2.51 |
| 21 | 5.94 | 5.32 | 2.32 | 1.76 |
| 22 | 4.50 | 4.06 | 1.39 | 1.05 |
| 23 | 2.42 | 2.33 | 0.65 | 0.51 |
| 24 | 1.00 | 0.94 | 0.27 | 0.19 |
| 25 | 0.42 | 0.31 | 0.076 | 0.037 |
| >25 | 0.49 | 0.30 | | |
| Total | 100.02 | 99.98 | 140.254 | 33.436 |
| $FP^b$, °C.(° F.) | 110(231) 106(224) | | | |

[a] "(N-Alkanes/TO) 100%" denotes, for a given carbon number, the weight percent off of n-alkanes divided by the weight percent off of total organics, the quotient being multiplied by 100%.
[b] "FP" denotes flash point as determined by Cleveland Open Cup method.

Although the present invention has been described in detail with reference to some preferred versions, other versions are possible. For example, the synthetic fluid can also be employed as the base liquid component in other wellbore fluids. (As used in the specification and claims, the term "wellbore fluid" means a fluid used while conducting pay zone drilling, underreaming, drilling in, plugging back, sand control, perforating, gravel packing, chemical treatment, hydraulic fracturing, cleanout, well killing, tubing and hardware replacement, and zone selective operations (e.g., well completion operations) as well as a fluid employed as a packer fluid or as a spotting fluid.) In addition to the base liquid, the wellbore fluids contain one or more additional ingredients such as proppants suitable for use in hydraulically fracturing subterranean formations, particulate agents suitable for use in forming a gravel pack, viscosifiers, organophilic clays, and fluid loss control agents.

Common proppants suitable for use in hydraulic fracturing procedures are quartz sand grains, tempered glass beads, sintered bauxite, resin coated sand, aluminum pellets, and nylon pellets. Generally, the proppants are employed in the wellbore fluids intended for use as hydraulic fracturing fluids and are used in concentrations of roughly about 1 to about 10 pounds per gallon of the wellbore fluid. The proppant size is typically smaller than about 2 mesh on the U.S. Sieve Series scale, with the exact size selected being dependent on the particular type of formation to be fractured, the available pressure and pumping rates, as well as other factors known to those skilled in the art.

Typical particulate agents employed in the wellbore fluids used as gravel packing fluids include, but are not limited to, quartz sand grains, glass beads, synthetic resins, resin coated sand, walnut shells, and nylon pellets. The gravel pack particulate agents are generally used in concentrations of about 1 to about 20 pounds per gallon of the wellbore fluid. The size of the particulate agent employed depends on the type of subterranean formation, the average size of formation particles, and other parameters known to those skilled in the art. Generally, particulate agents of about 8 to about 70 mesh on the U.S. Sieve Series scale are used.

Illustrative viscosifiers, organophilic clays, and fluid loss control agents optionally used in wellbore fluids and their concentrations are the same as discussed above in connection with drilling fluids.

The wellbore fluids are prepared by combining the synthetic fluid with any additional additive (e.g., hydraulic fracturing proppants; gravel pack particulate agents, viscosifiers, fluid loss control agents, and organophilic clays). The synthetic fluid typically comprises at least about 50 weight percent of the wellbore fluid, the weight percent being based on the weight of all ingredients present in the wellbore fluid. Accordingly, wellbore fluids containing at least about 60, 70, 80, or even 90 weight percent synthetic fluid are not uncommon. (In fact, in some cases, the synthetic fluid constitutes the entire wellbore fluid.) In terms of the liquid fraction of the wellbore fluid, the synthetic fluid generally comprises from about 50 to 100 weight percent of the liquids employed in wellbore fluids. For example, the synthetic fluid can comprise at least about 60, 70, 80, or 90 weight percent of the liquid portion of the wellbore fluid.

The specific techniques used when employing the wellbore fluid are determined by its intended use and are analogous to methodologies employed when using prior art wellbore fluids for corresponding completion or work-over operations. For example, when the wellbore fluid is employed as a gravel packing fluid, it is typically injected into the formation in accordance with the procedure discussed in U.S. Pat. No. 4,552,215, this patent being incorporated herein in its entirety by reference.

When employed as a fracturing fluid, the wellbore fluid of the present invention is usually injected into the formation using procedures analogous to those disclosed in U.S. Pat. No. 4,488,975; U.S. Pat. No. 4,553,601; Howard et al., *Hydraulic Fracturing,* Society of Petroleum Engineers of the American Institute of Mining, Metallurgical, and Petroleum Engineers, Inc., New York, N.Y. (1970); and Allen et al., *Production Operations, Well completions, Workover, and Stimulation,* 3rd Edition, Oil & Gas Consultants International, Inc., Tulsa, Okla. (1989) (Allen), volume 2, chapter 8; these patents and publications being incorporated herein in their entirety by reference.

When employed in a perforating operation, the wellbore fluid of the present invention is used according to the methodologies disclosed in volume 1, chapter 7 of Allen, referenced above.

Techniques for using packer fluids and well killing fluids, such as those discussed in volume 1, chapter 8 of Allen, are also applicable to the wellbore fluid of the present invention.

In addition, because the synthetic fluids of the present invention are lubricious, they can constitute up to about 10, and preferably from about 2 to about 5, weight percent of a water-based drilling fluid. In fact, any moving parts can be lubricated with these synthetic fluids.

Furthermore, while the synthetic fluid is generally manufactured by the Fischer-Tropsch process and various modifications thereof, fluids meeting the specifications set forth above in Tables I–V can also be obtained by further processing various petroleum refinery products (e.g., subjecting a petroleum product to further distillation, hydroisomerization, and/or hydrocracking procedures).

In view of the foregoing numerous other embodiments, the spirit and scope of the appended claims should not necessarily be limited to the description of the preferred versions contained herein.

What is claimed is:

1. A method for drilling a borehole in a subterranean formation, the method comprising the steps of:
   (A) rotating a drill bit at the bottom of the borehole; and
   (B) introducing a drilling fluid into the borehole to pick up drill cuttings and to carry at least a portion of the drill cuttings out of the borehole, where the drilling fluid comprises:
      (I) at least one additive selected from the group consisting of emulsifiers, wetting agents, viscosifiers, weighting agents, and fluid loss control agents; and
      (II) a base fluid comprising a mixture of paraffins prepared, at least in part, by a Fischer-Tropsch process, the mixture having a pour point less than about 10° C. (50° F.).

2. The method of claim 1 where the Fischer-Tropsch synthesis includes the step of reacting carbon monoxide and hydrogen over a catalyst to produce highly linear products.

3. The method of claim 1 where the Fischer-Tropsch synthesis includes the steps of (a) reacting carbon monoxide and hydrogen over a catalyst to produce highly linear products, a portion of which are olefins, and (b) hydrogenating at least some of the olefins.

4. The method of claim 1 where the Fischer-Tropsch synthesis includes the steps of (a) reacting carbon monoxide and hydrogen over a catalyst to produce highly linear products, a portion of which are olefins, (b) hydrogenating at least some of the olefins, and (c) hydroisomerizing at least some of the products of steps (a) and/or (b).

5. The method of claim 1 where the Fischer-Tropsch synthesis includes the steps of (a) reacting carbon monoxide and hydrogen over a catalyst to produce highly linear products, a portion of which are olefins, (b) hydrogenating at least some of the olefins to produce n-paraffin products, (c) hydroisomerizing at least some of the products of steps (a) and/or (b), and (d) hyrocracking at least some of the products of steps (a) and/or (b).

6. The method of claim 1 where the drilling fluid is non-toxic.

7. The method of claim 1 where the drilling fluid yields a 96 hour $LC_{50}$ Mysid shrimp bioassay test result greater than 100,000.

8. The method of claim 1 where the base fluid comprises about 40 to about 100 volume percent paraffins and up to about 60 volume percent water and the paraffins consist essentially of the Fischer-Tropsch synthesis reaction product.

9. The method of claim 1 where the base fluid comprises about 40 to about 100 volume percent paraffins, up to about 60 volume percent water, the paraffins consist essentially of the Fischer-Tropsch synthesis reaction product, and the drilling fluid yields a 96 hour $LC_{50}$ Mysid shrimp bioassay test result greater than 100,000.

10. A method for drilling a borehole in a subterranean formation, the method comprising the steps of:
    (A) rotating a drill bit at the bottom of the borehole; and
    (B) introducing a drilling fluid into the borehole to pick up drill cuttings and to carry at least a portion of the drill cuttings out of the borehole, where the drilling fluid comprises:
       (I) at least one additive selected from the group consisting of emulsifiers, wetting agents, viscosifiers, weighting agents, and fluid loss control agents; and (II) a base fluid comprising a mixture of paraffins prepared, at least in part, by a Fischer-Tropsch process, the mixture having a viscosity at 40° C. (104° F.) of 1 to about 10 cst.

11. A method for drilling a borehole in a subterranean formation, the method comprising the steps of:

(A) rotating a drill bit at the bottom of the borehole; and (B) introducing a drilling fluid into the borehole to pick up drill cuttings and to carry at least a portion of the drill cuttings out of the borehole, where the drilling fluid comprises:

(I) at least one additive selected from the group consisting of emulsifiers, wetting agents, viscosifiers, weighting agents, and fluid loss control agents; and (II) a base fluid comprising a mixture of paraffins prepared, at least in part, by a Fischer-Tropsch process, the mixture being composed of less than 1 weight percent of hydrocarbons containing more than 25 carbon atoms.

12. A method for drilling a borehole in a subterranean formation, the method comprising the steps of:

(A) rotating a drill bit at the bottom of the borehole; and (B) introducing a drilling fluid into the borehole to pick up drill cuttings and to carry at least a portion of the drill cuttings out of the borehole, where the drilling fluid comprises:

(I) at least one additive selected from the group consisting of emulsifiers, wetting agents, viscosifiers, weighting agents, and fluid loss control agents; and (II) a base fluid comprising a mixture of paraffins prepared, at least in part, by a Fischer-Tropsch process, the mixture comprising 40 to 85 volume percent of the drilling fluid.

13. A method for drilling a borehole in a subterranean formation, the method comprising the steps of:

(A) rotating a drill bit at the bottom of the borehole; and (B) introducing a drilling fluid into the borehole to pick up drill cuttings and to carry at least a portion of the drill cuttings out of the borehole, where the drilling fluid comprises:

(I) at least one additive selected from the group consisting of emulsifiers, wetting agents, viscosifiers, weighting agents, and fluid loss control agents; and (II) a base fluid comprising a mixture of paraffins prepared by hydrogenating a Fischer-Tropsch synthesis reaction product process, the mixture having a pour point less than about 10° C. (50° F.).

14. A method for drilling a borehole in a subterranean formation, the method comprising the steps of:

(A) rotating a drill bit at the bottom of the borehole; and (B) introducing a drilling fluid into the borehole to pick up drill cuttings and to carry at least a portion of the drill cuttings out of the borehole, where the drilling fluid comprises:

(I) at least one additive selected from the group consisting of emulsifiers, wetting agents, viscosifiers, weighting agents, and fluid loss control agents; and (II) a base fluid comprising a mixture of paraffins prepared, at least in part, by a Fischer-Tropsch process, the mixture having at least two of the following three properties:

(a) a pour point less than about 10° C. (50° F.);

(b) a viscosity at 40° C. (104° F.) of 1 to about 10 cst; and (c) a concentration of less than 1 weight percent of hydrocarbons containing more than 25 carbon atoms.

15. The method of claim 14 where the mixture has a pour point less than about 10° C. (50° F.) and a viscosity at 40° C. (104° F.) of 1 to about 10 cst.

16. The method of claim 14 where the mixture has a pour point less than about 10° C. (50° F.) and a concentration of less than 1 weight percent of hydrocarbons containing more than 25 carbon atoms.

17. The method of claim 14 where the mixture has a viscosity at 40° C. (104° F.) of 1 to about 10 cst and a concentration of less than 1 weight percent of hydrocarbons containing more than 25 carbon atoms.

18. The method of claim 14 where the mixture has a pour point less than about 10° C. (50° F.), a viscosity at 40° C. (104° F.) of 1 to about 10 cst, and a concentration of less than 1 weight percent of hydrocarbons containing more than 25 carbon atoms.

19. The method of claim 14 where the mixture comprises 40 to 85 volume percent of the wellbore fluid.

* * * * *